United States Patent
Athad

(10) Patent No.: US 10,363,722 B2
(45) Date of Patent: Jul. 30, 2019

(54) BLADE-SHAPED CUTTING INSERT AND CUTTING TOOL THEREFOR

(71) Applicant: Iscar, Ltd., Tefen (IL)

(72) Inventor: Shimon Athad, Maalot (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 15/467,165

(22) Filed: Mar. 23, 2017

(65) Prior Publication Data

US 2018/0272431 A1 Sep. 27, 2018

(51) Int. Cl.
- *B23B 27/04* (2006.01)
- *B23B 29/04* (2006.01)
- *B32B 27/04* (2006.01)
- *B23B 27/08* (2006.01)
- *B23B 27/16* (2006.01)

(52) U.S. Cl.
CPC .............. *B32B 27/04* (2013.01); *B23B 27/08* (2013.01); *B23B 27/164* (2013.01); *B23B 29/043* (2013.01); *B23B 2200/0485* (2013.01); *B23B 2200/121* (2013.01); *B23B 2200/161* (2013.01);

(Continued)

(58) Field of Classification Search
CPC ....... B23B 27/04; B23B 27/045; B23B 27/14; B23B 27/16; B23B 2210/02; B23B 2210/022; B23B 2205/02; Y10T 407/25
See application file for complete search history.

(56) References Cited

U.S. PATENT DOCUMENTS

| 15,190 A | * | 6/1856 | Mooney ................. B23B 27/04 407/102 |
| 622,625 A | * | 4/1899 | Hill ........................ B23B 27/16 407/91 |

(Continued)

FOREIGN PATENT DOCUMENTS

| CH | 254599 A | * | 5/1948 | ........... B23B 29/043 |
| DE | 2041380 A1 | * | 3/1972 | ........... B23B 29/043 |

(Continued)

OTHER PUBLICATIONS

Description FR1283855 (translation) obtained at https://worldwide.espacenet.com/ (last visited Feb. 26, 2019).*

(Continued)

*Primary Examiner* — Ryan C Rufo
(74) *Attorney, Agent, or Firm* — Womble Bond Dickinson (US) LLP

(57) ABSTRACT

A blade-shaped cutting insert has opposing first and second insert side surfaces with a peripheral surface extending therebetween, and a first cutting portion having a first primary cutting edge extending between the first and second insert side surfaces, defining a maximum insert width of the cutting insert. The peripheral surface includes an upper surface and first and second diverging flank surfaces bisected by a first plane transverse to the upper surface. The cutting insert has a maximum insert length measured perpendicular to the first plane which is more than sixteen times greater than the maximum insert width, and a maximum insert height measured parallel to the first plane which is more than ten times greater than the maximum insert width. The cutting insert is removably secured in an insert receiving pocket of a tool holder, which is defined by an upper clamping jaw and a lower clamping jaw.

25 Claims, 6 Drawing Sheets

(52) U.S. Cl.
CPC ..... *B23B 2205/02* (2013.01); *B23B 2205/125* (2013.01); *B23B 2220/12* (2013.01)

(56) References Cited

U.S. PATENT DOCUMENTS

| | | | | |
|---|---|---|---|---|
| 2,225,327 | A * | 12/1940 | Walker | B23B 29/043 407/113 |
| 2,416,975 | A | 3/1947 | Anthony | |
| 3,182,534 | A * | 5/1965 | Hoffmann | B23B 29/16 407/120 |
| 3,551,977 | A | 1/1971 | Novkov | |
| 3,760,474 | A * | 9/1973 | Stein | B23B 27/08 407/117 |
| 3,846,882 | A * | 11/1974 | Stein | B23B 27/045 407/101 |
| 4,631,993 | A * | 12/1986 | Kelm | B23B 27/04 407/101 |
| 5,370,023 | A * | 12/1994 | Morgan | B23B 27/007 407/112 |
| 6,074,138 | A * | 6/2000 | Jonsson | B23B 27/045 407/117 |
| 7,011,476 | B1 * | 3/2006 | King | B23B 27/04 407/101 |
| 7,419,337 | B2 | 9/2008 | Berminge | |
| 8,647,028 | B2 | 2/2014 | Athad | |
| 2001/0022123 | A1 * | 9/2001 | Schiffers | B23B 27/08 82/158 |
| 2004/0022592 | A1 * | 2/2004 | Inayama | B23B 27/08 407/117 |
| 2004/0247404 | A1 | 12/2004 | Oettle | |
| 2008/0162154 | A1 * | 7/2008 | Fein | G06Q 10/06 705/14.4 |
| 2010/0135736 | A1 | 6/2010 | Hecht | |
| 2010/0158622 | A1 * | 6/2010 | Kaufmann | B23B 27/04 407/107 |
| 2011/0158756 | A1 * | 6/2011 | Athad | B23B 27/045 407/108 |
| 2014/0050542 | A1 * | 2/2014 | Zeeb | B23B 27/04 407/103 |
| 2014/0234040 | A1 | 8/2014 | Hecht | |
| 2014/0348601 | A1 * | 11/2014 | Hecht | B23B 27/1622 407/104 |
| 2015/0056029 | A1 * | 2/2015 | Shimamoto | B23B 27/045 407/115 |
| 2015/0063929 | A1 | 3/2015 | Hecht | |
| 2015/0158090 | A1 | 6/2015 | Hecht | |

FOREIGN PATENT DOCUMENTS

| | | | | |
|---|---|---|---|---|
| DE | | 2533035 A1 * | 2/1977 | ............. B23B 27/04 |
| EP | | 1424151 A1 * | 6/2004 | ............. B23B 27/04 |
| FR | | 1283855 A * | 2/1962 | ........... B23B 29/043 |
| FR | | 3009218 B1 * | 1/2016 | ............. B23B 27/04 |
| GB | | 1402946 | 5/1973 | |
| GB | | 2085333 A * | 4/1982 | ............. B23B 27/04 |
| WO | WO 2013033740 A1 * | | 3/2013 | ........... B23B 29/043 |

OTHER PUBLICATIONS

Description WO2013033740 (translation) obtained at https://worldwide.espacenet.com/ (last visited Feb. 26, 2019).*
Seco: "Catalogue & Technical Guide Apr. 2016," Apr. 2016, XP002781552, pp. 668, 680, 683 and 688, retrieved from the internet: URL:http://www.toolexpert.ee/Kataloogid/Seco/Turning_2016-April_LR.pdf.
Zykin, A.S., "Parting-off titanium ingots in a lathe," Russian Engineering Journal, Jan. 1, 1969, 49(3):75-76, XP001338991.
International Search Report dated Jun. 20, 2018, issued in PCT counterpart application (No. PCT/IL2018/050271).
Written Opinion dated Jun. 20, 2018, issued in PCT counterpart application (No. PCT/IL2018/050271).

* cited by examiner

US 10,363,722 B2

BLADE-SHAPED CUTTING INSERT AND CUTTING TOOL THEREFOR

FIELD OF THE INVENTION

The present invention relates to a blade-shaped cutting insert and a cutting tool therefor, for use in metal cutting processes in general, and for grooving and parting operations in particular.

BACKGROUND OF THE INVENTION

Within the field of cutting tools used in grooving and parting operations, there are many examples of blade-shaped cutting tools with a cutting insert removably retained in an insert receiving pocket of a tool holder.

GB 1402946 discloses a parting off tool comprising a holder having a reversible cutting insert mounted on a seating of a blade like forward portion of the holder, the insert being secured by a bridge type clamping member secured by a screw to the holder. The cutting insert has a cutting edge formed by a central portion and two side portions set back from the central portion for forming separate cuttings during a cutting operation. The cutting edges are formed at each end of the insert to permit the insert to be reversed when one end becomes blunt as a result of use. Stop pins are provided on the holder against which the inoperative end of the insert abuts.

U.S. Pat. No. 8,647,028 discloses a cutting tool for grooving, parting and turning machining operations capable of grooving to unlimited depths of cut. The cutting tool includes an indexable double-ended cutting insert having a downwardly extending insert clamping portion resiliently clamped in a self-retaining manner in an insert pocket so that chip formation is not hindered during such machining operations.

US20140234040A1 discloses a double-ended cutting insert having a pair of cutting portions on opposite ends, and a bottom surface provided with a pair of spaced-apart key recesses and abutment surfaces only near the cutting portions.

US20150063929A1 discloses an elongated rectangular holder blade provided with insert pockets for resiliently retaining a flag-shaped cutting insert.

It is an object of the present invention to provide an improved blade-shaped cutting insert.

It is also an object of the present invention to provide an improved cutting tool in which the blade-shaped cutting insert is removably secured in a tool holder with a high level of stability.

It is a further object of the present invention to provide an improved cutting tool in which the blade-shaped cutting insert can be quickly and efficiently inserted into the tool holder.

It is yet a further object of the present invention to provide an improved cutting tool particularly suitable for very narrow and deep grooving and parting operations.

SUMMARY OF THE INVENTION

In accordance with the present invention, there is provided a blade-shaped cutting insert, comprising:
opposing first and second insert side surfaces with a peripheral surface extending therebetween; and
a first cutting portion having a first primary cutting edge extending between the first and second insert side surfaces, defining a maximum insert width of the cutting insert,
the peripheral surface including first and second diverging flank surfaces and an upper surface, the first and second diverging flank surfaces bisected by a first plane transverse to the upper surface,
wherein:
the cutting insert has a maximum insert length measured perpendicular to the first plane, and a maximum insert height measured parallel to the first plane,
the maximum insert length is at least twelve times greater than the maximum insert width, and
the maximum insert height is at least eight times greater than the maximum insert width,
and wherein:
the maximum insert width is less than 1.5 mm.

Also in accordance with the present invention, there is provided a blade-shaped cutting insert, comprising:
opposing first and second insert side surfaces with a peripheral surface extending therebetween; and
a first cutting portion having a first primary cutting edge extending between the first and second insert side surfaces, defining a maximum insert width of the cutting insert,
the peripheral surface including first and second diverging flank surfaces and an upper surface, the first and second diverging flank surfaces bisected by a first plane transverse to the upper surface,
wherein:
the cutting insert has a maximum insert length measured perpendicular to the first plane, and a maximum insert height measured parallel to the first plane,
the maximum insert length is more than sixteen times greater than the maximum insert width, and
the maximum insert height is more than ten times greater than the maximum insert width.

Further in accordance with the present invention, there is provided a cutting tool comprising a tool holder and the cutting insert of the sort described above removably secured in an insert receiving pocket of the tool holder, wherein the insert receiving pocket opens out to a forward end of the tool holder and is defined by an upper clamping jaw and a lower clamping jaw.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

A first aspect of the present invention relates to blade-shaped cutting insert 20, having opposing first and second insert side surfaces 22a, 22b with a peripheral surface 24 extending therebetween.

In some embodiments of the present invention, the cutting insert 20 may preferably be manufactured by form pressing and sintering a cemented carbide, such as tungsten carbide, and may be coated or uncoated.

Figure 1:
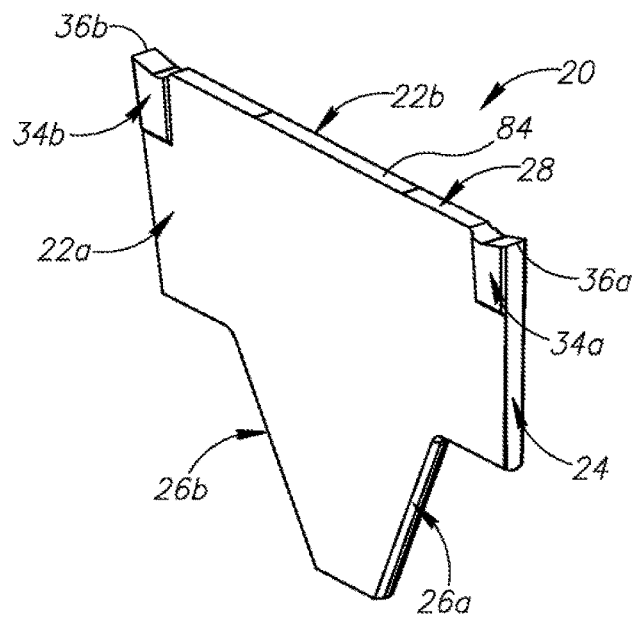
FIG. 1 is a perspective view of a cutting insert in accordance with some embodiments of the present invention.
Figure 2A:
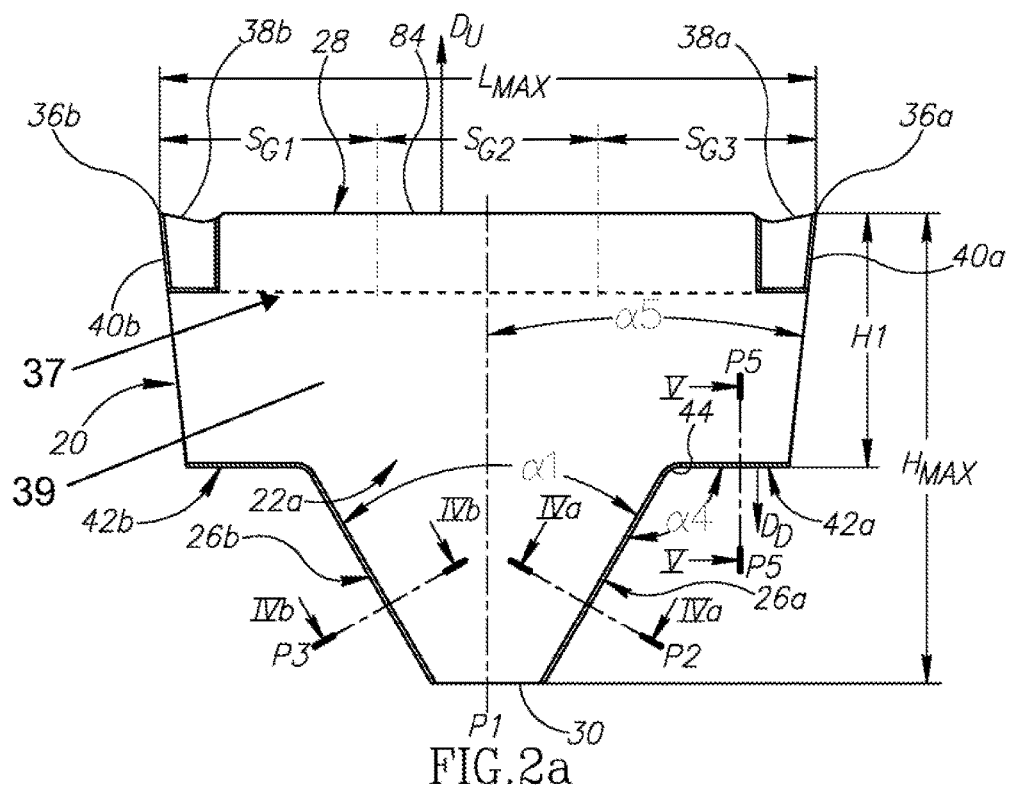
FIG. 2a is a side view of the cutting insert shown in FIG. 1.
Figure 2B:
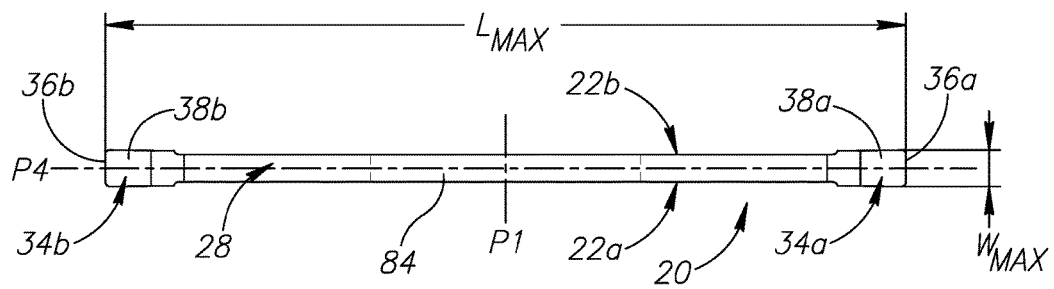
FIG. 2b is a top view of the cutting insert shown in FIG. 1.
Figure 3:
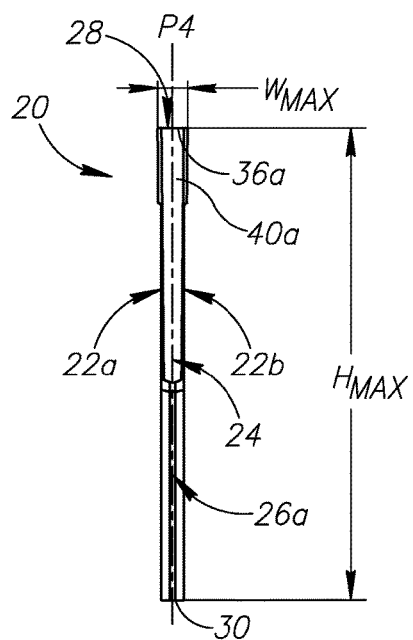
FIG. 3 is an end view of the cutting insert shown in FIG. 1.

The various features of cutting insert 20 are shown in proportion to one another in FIGS. 1 to 3, except for unavoidable inaccuracies due to copying, etc.

As shown in FIGS. 1 to 3, the peripheral surface 24 includes first and second diverging flank surfaces 26a, 26b and an upper surface 28, and the first and second diverging flank surfaces 26a, 26b are bisected by a first plane P1 ("vertical insert plane") transverse to the upper surface 28.

In some embodiments of the present invention, as shown in FIG. 2a, the first and second diverging flank surfaces 26a, 26b may form an acute internal first angle $\alpha 1$.

Also in some embodiments of the present invention, the first angle $\alpha 1$ may have a value of between 30 and 80 degrees.

Further in some embodiments of the present invention, the first and second diverging flank surfaces 26a, 26b may be spaced apart by an intermediate surface 30. The vertical insert plane P1 may bisect the intermediate surface 30.

It should be appreciated that use of the terms "internal angle" and "external angle" throughout the description and claims refers to an angle between two planar surface components of a pair of surfaces as measured internal and external to the member on which the two surface components are formed, respectively.

Figure 4A:
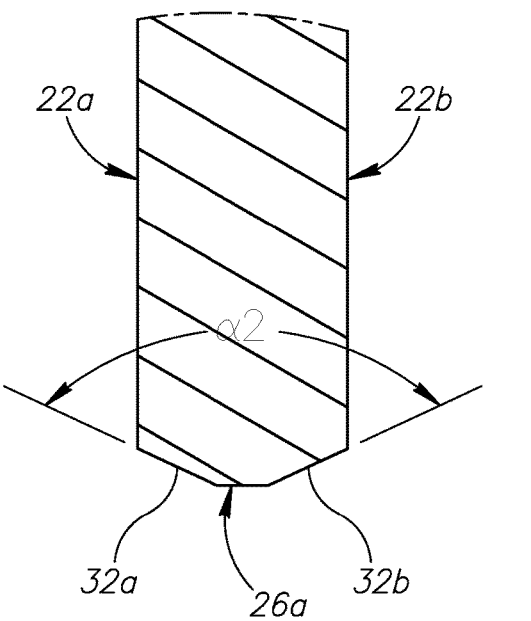
FIG. 4a is a cross-sectional view of the cutting insert shown in FIG. 2a, taken along the line IVa-IVa.
Figure 4B:
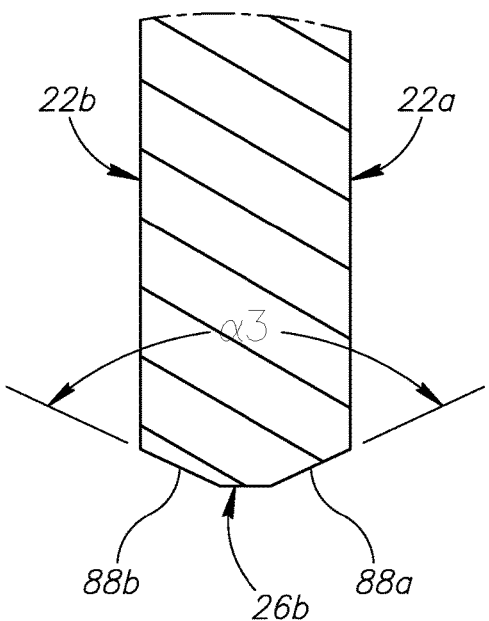
FIG. 4b is a cross-sectional view of the cutting insert shown in FIG. 2a, taken along the line IVb-IVb.

As shown in FIGS. 4a and 4b, in cross-sections taken in second and third planes P2, P3 transverse to the vertical insert plane P1, the first and second flank surfaces 26a, 26b may be respectively V-shaped.

In some embodiments of the present invention, as shown in FIGS. 4a and 4b, in the cross-sections taken in the second and third planes P2, P3, the first and second flank surfaces 26a, 26b may be respectively convex.

It should be appreciated that for embodiments of the present invention that the first and second flank surfaces 26a, 26b are convex, as opposed to concave, form pressing of the cutting insert 20 can be performed with greater ease and efficiency.

In some embodiments of the present invention, the first flank surface 26a may have two parallely extending first flank sub-surfaces 32a, 32b, and the second flank surface 26b may have two parallely extending second flank sub-surfaces 88a, 88b.

Also in some embodiments of the present invention, as shown in FIGS. 4a and 4b, in the cross-sections taken in the second and third planes P2, P3, the two first and two second flank sub-surfaces (32a, 32b; 88a, 88b) may respectively form obtuse internal second and third angles $\alpha 2$, $\alpha 3$.

As shown in FIGS. 2a, 2b and 3, the cutting insert 20 has a first cutting portion 34a with a first primary cutting edge 36a extending between the first and second insert side surfaces 22a, 22b, defining a maximum insert width $W_{MAX}$ between the first cutting portion 34a and a second cutting portion 34b of the cutting insert 20.

In some embodiments of the present invention, the maximum insert width $W_{MAX}$ may be less than 1.5 mm.

It should be appreciated that having a very narrow maximum insert width $W_{MAX}$ of less than 1.5 mm enables the cutting insert 20 to perform parting operations with reduced 'waste' of the workpiece material.

In some embodiments of the present invention, the cutting insert 20 may exhibit mirror symmetry about a fourth plane P4 ("longitudinal insert plane") located midway between the first and second insert side surfaces 22a, 22b and intersecting the first primary cutting edge 36a.

As shown in FIGS. 2a and 2b, the cutting insert 20 has a maximum insert length $L_{MAX}$ measured perpendicular to the vertical insert plane P1, and in FIGS. 2a and 3, the cutting insert 20 has a maximum insert height $H_{MAX}$ measured parallel to the vertical insert plane P1.

According to the present invention, the maximum insert length $L_{MAX}$ is at least twelve times greater than the maximum insert width $W_{MAX}$, and the maximum insert height $H_{MAX}$ is at least eight times greater than the maximum insert width $W_{MAX}$.

In some embodiments of the present invention, the maximum insert height $H_{MAX}$ may be measured between the upper surface 28 and the intermediate surface 30.

Also in some embodiments of the present invention, and as can be seen from the proportional drawing of FIG. 2b, the maximum insert length $L_{MAX}$ may be more than sixteen times greater than the maximum insert width $W_{MAX}$.

Further in some embodiments of the present invention, and as can be seen from the proportional drawing of FIG. 3, the maximum insert height $H_{MAX}$ may be more than ten times greater than the maximum insert width $W_{MAX}$.

As shown in FIGS. 1 to 3, the first primary cutting edge 36a may be formed at the intersection of a first rake surface 38a and a first relief surface 40a, with the first rake surface 38a disposed on the upper surface 28, and the first relief surface 40a spaced apart from the first flank surface 26a by a first lower surface 42a. As seen in FIG. 2a, the first lower surface 42a may form a step between the first relief surface 40a and the first flank surface 26a.

In some embodiments of the present invention, as shown in FIG. 2a, the first lower surface 42a may form an obtuse external fourth angle $\alpha 4$ with the first flank surface 26a.

Also in some embodiments of the present invention, the fourth angle $\alpha 4$ may have a value of between 135 and 160 degrees.

Further in some embodiments of the present invention, the peripheral surface 24 may include a curved transitional surface 44 extending between the first flank surface 26a and the first lower surface 42a.

Yet further in some embodiments of the present invention, as shown in FIG. 2a, the first relief surface 40a may form an acute fifth angle $\alpha 5$ with the vertical insert plane P1, and the fifth angle $\alpha 5$ may be equal to or less than 10 degrees.

As shown in FIG. 2a, the cutting insert 20 may exhibit mirror symmetry about the vertical insert plane P1, and include a second cutting portion 34b having a second primary cutting edge 36b. As compared to the elongated holder blade seen in aforementioned US201540063929A1 discussed above, cutting insert 20 is devoid of insert receiving pockets.

In some embodiments of the present invention, the maximum insert length $L_{MAX}$ may be measured between the first and second primary cutting edges 36a, 36b.

Also in some embodiments of the present invention, the second primary cutting edge 36b may be formed at the intersection of a second rake surface 38b and a second relief surface 40b, with the second rake surface 38b disposed on the upper surface 28, and the second relief surface 40b spaced apart from the second flank surface 26b by a second lower surface 42b.

As shown in FIG. 2a, a fastening portion 84 of the upper surface 28 intersecting the vertical insert plane P1 may face in an upward direction $D_U$.

In some embodiments of the present invention, the first and second flank surfaces 26a, 26b may diverge away from each other in the upward direction $D_U$, i.e., in a direction away from the intermediate surface 30. As seen in FIG. 2a, the first and second flank surfaces 26a, 26b slope in the upward direction $D_U$ from the intermediate surface 30 to the first and second lower surfaces 42a, 42b, respectively.

As shown in FIG. 2a, the first lower surface 42a may face in a downward direction $D_D$ opposite to the upward direction $D_U$.

In some embodiments of the present invention, the first lower surface 42a may be parallel to the fastening portion 84.

Also in some embodiments of the present invention, the first lower surface 42a may be perpendicular to the vertical insert plane P1.

Further in some embodiments of the present invention, the first primary cutting edge 36a may be located a maximum first height H1 above the first lower surface 42a when measured parallel to the vertical insert plane P1, and the maximum first height H1 may be less than two-thirds the maximum insert height $H_{MAX}$.

Figure 5:
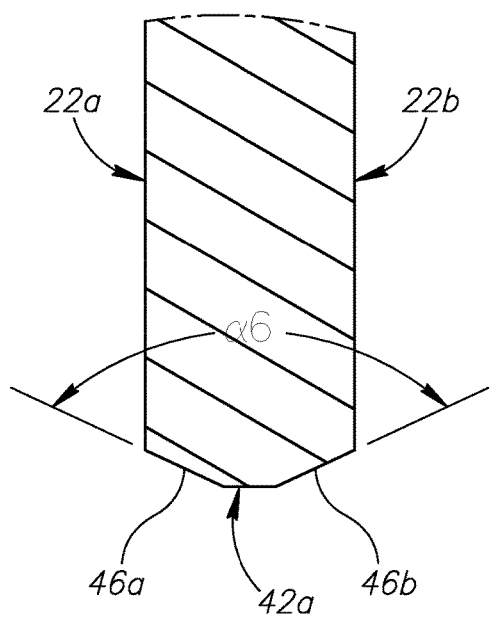
FIG. 5 is a cross-sectional view of the cutting insert shown in FIG. 2a, taken along the line V-V.

As shown in FIG. 5, in a cross-section taken in a fifth plane P5 parallel to the vertical insert plane P1, the first lower surface 42a may be V-shaped.

In some embodiments of the present invention, as shown in FIG. 5, in the cross-section taken in the fifth plane P5, the first lower surface 42a may be convex.

It should be appreciated that for embodiments of the present invention in which the first lower surface 42a is convex, as opposed to concave, form pressing of the cutting insert 20 can be performed with greater ease and efficiency.

Also in some embodiments of the present invention, the first lower surface 42a may have two parallely extending first lower sub-surfaces 46a, 46b, and as shown in FIG. 5, in the cross-section taken in the fifth plane P5, the two first lower sub-surfaces 46a, 46b may form an obtuse internal sixth angle α6.

As shown in FIGS. 6 to 10, a second aspect of the present invention relates to a cutting tool 48 comprising a tool holder 50 and the cutting insert 20 removably secured in an insert receiving pocket 52 of the tool holder 50.

Figure 6:
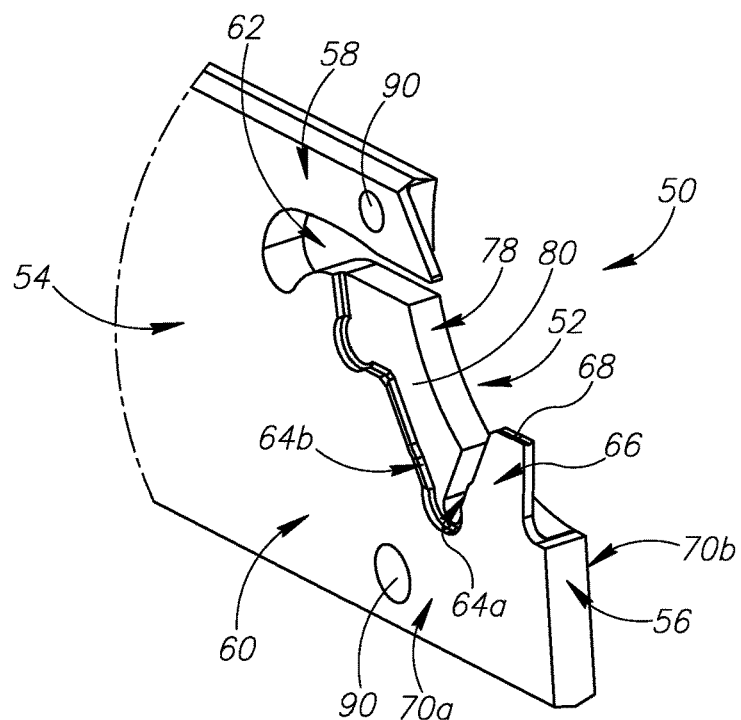
FIG. 6 is a perspective view of a tool holder in accordance with some embodiments of the present invention.
Figure 7:
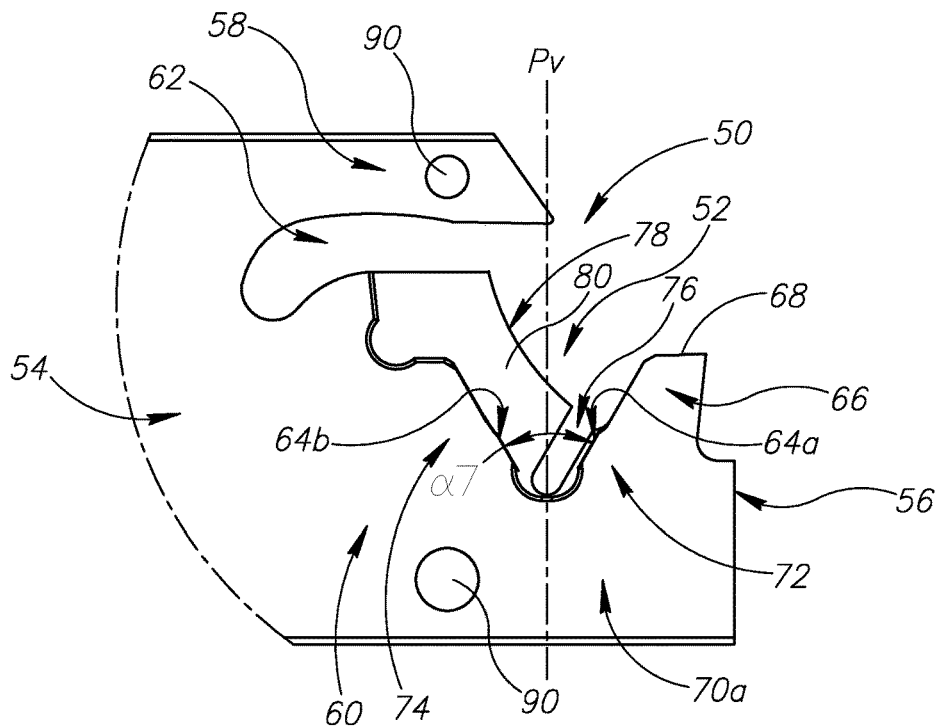
FIG. 7 is a first side view of the tool holder shown in FIG. 6.

The various features seen in the tool holder 50 of FIGS. 6 and 7 are shown in proportion to one another, except for unavoidable inaccuracies due to copying, etc.

In some embodiments of the present invention, the tool holder 50 may preferably be manufactured from tool steel.

Also in some embodiments of the present invention, as shown in FIGS. 6 and 7, a tool shank 54 may extend rearwardly from the insert receiving pocket 52.

Figure 8:
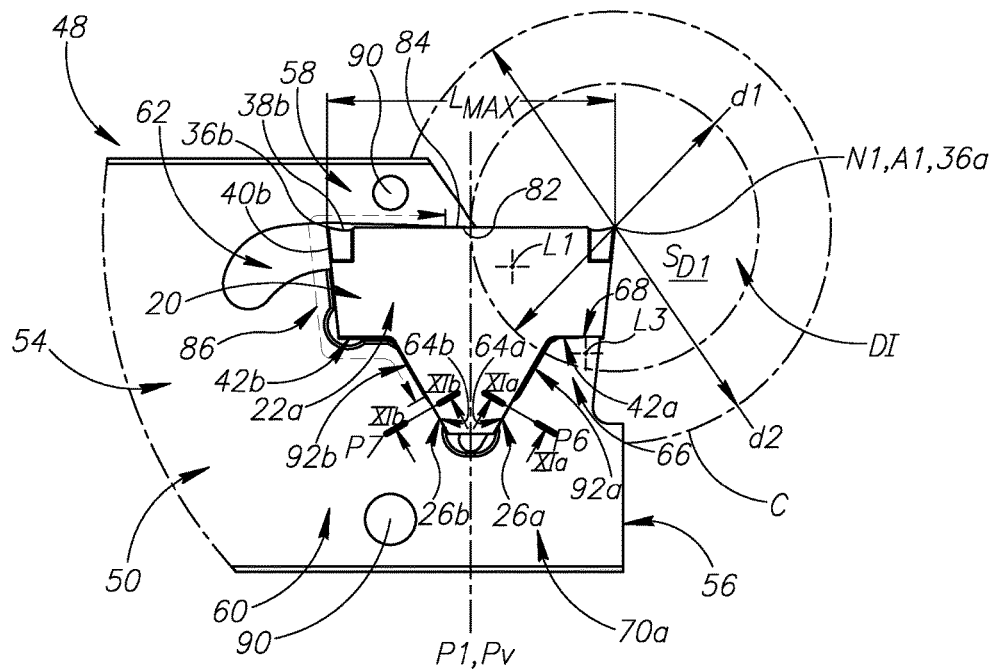
FIG. 8 is a first side view of a cutting tool in accordance with some embodiments of the present invention.
Figure 9:
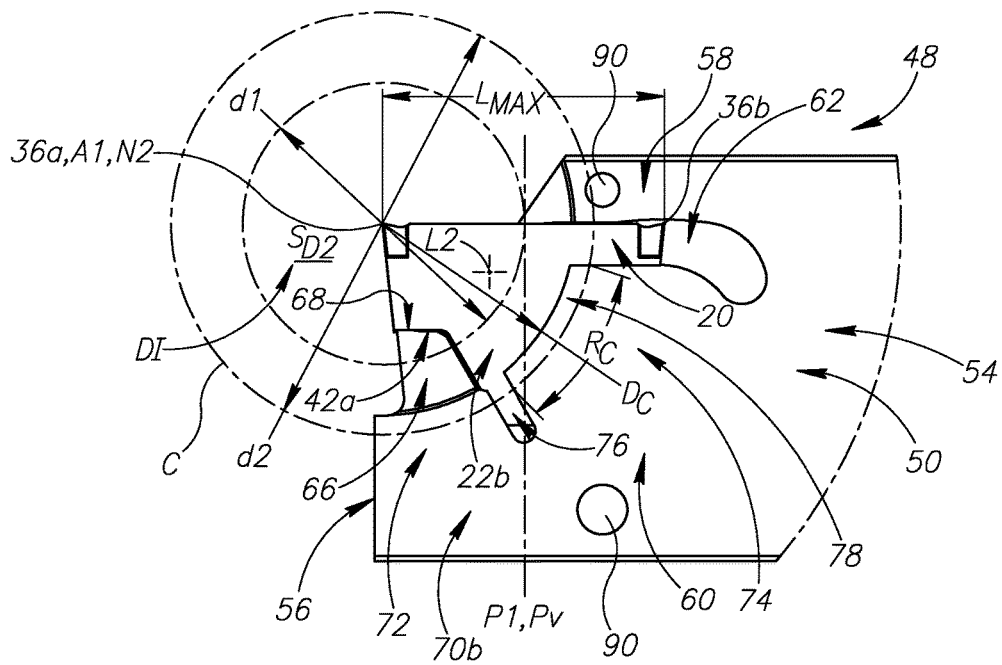
FIG. 9 is a second side view of the cutting tool shown in FIG. 8.
Figure 10:
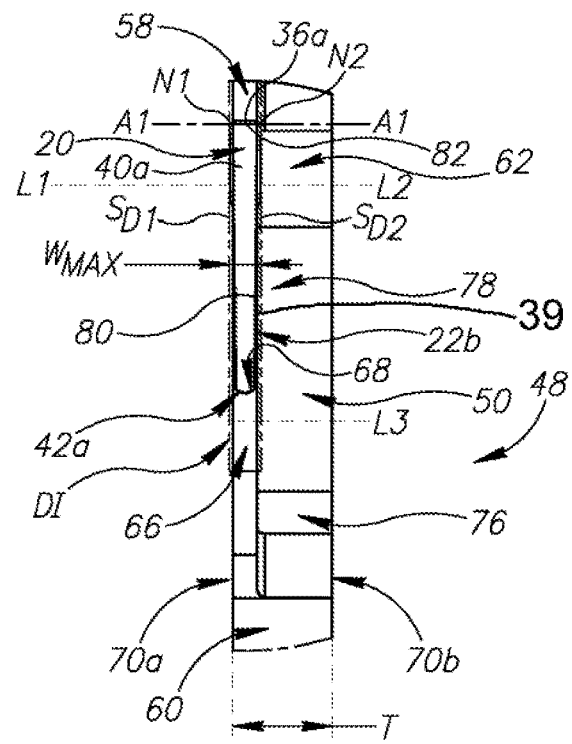
FIG. 10 is an end view of the cutting tool shown in FIG. 8.

As shown in FIGS. 8 to 10, the first primary cutting edge 36a is operative and has first and second lateral end points N1, N2 contained in opposing first and second circular sides $S_D1, S_D2$, respectively, of an imaginary disc DI.

It should be appreciated that the first and second circular sides $S_D1, S_D2$ are spaced apart by a distance equal to the maximum insert width $W_{MAX}$, which is therefore also the thickness of the imaginary disc DI.

The imaginary disc DI has a central disc axis A1 containing at least one of the first and second lateral end points N1, N2 and a first diameter d1 equal to the maximum insert length $L_{MAX}$.

In some embodiments of the present invention, including embodiments in which the cutting insert 20 exhibits mirror symmetry about the longitudinal insert plane P4, the central disc axis A1 may contain both of the first and second lateral end points N1, N2.

Also in some embodiments of the present invention, first and second imaginary lines L1, L2 parallel to the central disc axis A1 and extending laterally outwardly from any respective points on the first and second circular sides $S_D1, S_D2$, may not intersect any portion of the tool holder 50.

It should be appreciated that in some embodiments of the present invention, as shown in FIG. 9, the cutting tool 48 may have a cutting depth $D_C$ greater than the radius of the imaginary disc DI, and thus greater than half the maximum insert length $L_{MAX}$.

It should also be appreciated that by virtue of the cutting insert 20 being manufactured from cemented carbide, which has a greater value of Young's modulus than the tool steel from which the tool holder 50 may be manufactured, and also having high relative values of maximum insert length $L_{MAX}$ and maximum insert height $H_{MAX}$, the cutting tool 48 is advantageously provided with a high level of rigidity in the cutting region.

As shown in FIGS. 6 and 7, the insert receiving pocket 52 opens out to a forward end 56 of the tool holder 50 and is defined by an upper clamping jaw 58 and a lower clamping jaw 60.

In some embodiments of the present invention, the upper and lower clamping jaws 58, 60 may also be spaced apart by a clamping slot 62.

Also in some embodiments of the present invention, the upper clamping jaw 58 may be resiliently displaceable relative to the lower clamping jaw 60.

Further in some embodiments of the present invention, each of the upper and lower clamping jaws 58, 60 may have a through hole 90.

Each through hole 90 may be adapted to receive a respective member of an actuating key (not shown), which serves to facilitate insertion and removal of the cutting insert 20 into and out of the insert receiving pocket 52.

As shown in FIG. 7, in a side view of the tool holder 50, the insert receiving pocket 52 may include first and second diverging abutment surfaces 64a, 64b bisected by a vertical pocket plane $P_V$.

In some embodiments of the present invention, the first and second abutment surfaces 64a, 64b may be disposed on the lower clamping jaw 60.

Also in some embodiments of the present invention, as shown in FIG. 7, the first and second abutment surfaces 64a, 64b may form an acute external seventh angle α7.

Further in some embodiments of the present invention, the seventh angle α7 may have a value of between 30 and 80 degrees.

Yet further in some embodiments of the present invention, the first and second abutment surfaces 64a, 64b may exhibit mirror symmetry about the vertical pocket plane $P_V$.

As shown in FIGS. 8 and 9, a portion of the first flank surface 26a may be in contact with the first abutment surface 64a and a portion of the second flank surface 26b may be in contact with the second abutment surface 64b.

In some embodiments of the present invention, the vertical insert plane P1 and the vertical pocket plane $P_V$ may be coplanar.

Also in some embodiments of the present invention, the first and second flank surfaces 26a, 26b may respectively include first and second non-contacting flank portions 92a, 92b which do not make contact with the lower clamping jaw 60.

The first and second non-contacting flank portions 92a, 92b may be located closer to the first and second lower surfaces 42a, 42b, respectively, than the above-mentioned portions of the first and second flank surfaces 26a, 26b which do make contact with the first and second abutment surfaces 64a, 64b.

It should be appreciated that the first and second abutment surfaces 64a, 64b may be located outside the space defined by the imaginary disc DI.

It should be also appreciated that in some embodiments of the present invention, only one of the two first flank sub-surfaces 32a, 32b of the first flank surface 26a may be in contact with the first abutment surface 64a, and only one of the two second flank sub-surfaces 34a, 34b of the second flank surface 26b may be in contact with the second abutment surface 64b.

It should be further appreciated that for embodiments of the present invention, in which the cutting insert 20 has two cutting portions 34a, 34b, and the second primary cutting edge 36b is operative (not shown), a portion of the first flank surface 26a may be in contact with the second abutment surface 64b and a portion of the second flank surface 26b may be in contact with the first abutment surface 64a.

As shown in FIGS. 8 and 10, a third imaginary line L3 parallel to the central disc axis A1 and extending laterally inwardly from a point on the first or second circular side $S_D1$, $S_D2$ may intersect a front support portion 66 of the lower clamping jaw 60.

As shown in FIGS. 8 to 10, the cutting insert's first lower surface 42a may be in contact with a front support surface 68 on the front support portion 66 of the lower clamping jaw 60.

It should be appreciated that locating the front support surface 68 within the space defined by the imaginary disc DI provides additional support to the cutting insert 20 via the first lower surface 42a, and also improved accuracy by virtue of the close proximity of the lower surface 42a to the operative first primary cutting edge 36a.

In some embodiments of the present invention, the first lower surface 42a may be located forward of the vertical pocket plane $P_V$.

For embodiments of the present invention that the first lower surface 42a is V-shaped in the cross-section taken in the fifth plane P5, the front support surface 68 may be correspondingly V-shaped.

It should be appreciated that for embodiments of the present invention, in which the cutting insert 20 has two cutting portions 34a, 34b, and the second primary cutting edge 36b is operative (not shown), the second lower surface 42b may be in contact with the front support surface 68 and located forward of the vertical pocket plane $P_V$.

As shown in FIG. 10, the lower clamping jaw 60 may have opposing first and second lower jaw side surfaces 70a, 70b, and the first and second lower jaw side surfaces 70a, 70b may define a lower jaw thickness T.

In some embodiments of the present invention, the lower jaw thickness T may be more than twice the maximum insert width $W_{MAX}$, thus advantageously contributing to the rigidity of the cutting tool 48.

Also in some embodiments of the present invention, the lower jaw thickness T may be less than five times the maximum insert width $W_{MAX}$, thus providing an advantageously narrow blade-shaped cutting tool 48.

Further in some embodiments of the present invention, the first and second lower jaw side surfaces 70a, 70b may be parallel.

Figures 11A, 11B:
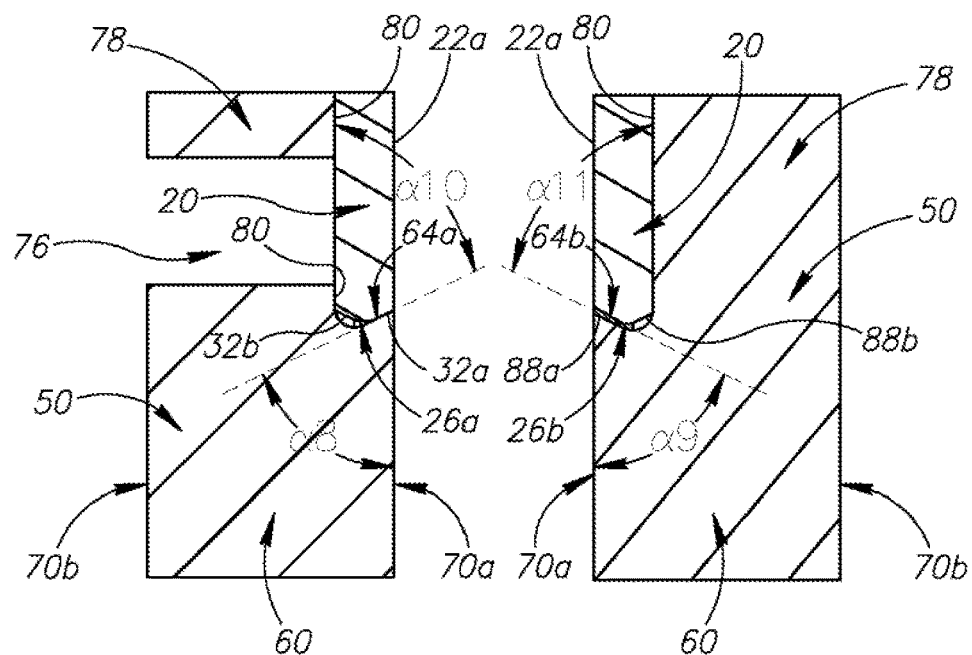
FIG. 11a is a cross-sectional view of the cutting tool shown in FIG. 8, taken along the line XIa-XIa.
FIG. 11b is a cross-sectional view of the cutting tool shown in FIG. 8, taken along the line XIb-XIb.

As shown in FIGS. 11a and 11b, in cross-sections taken in sixth and seventh planes P6, P7 transverse to the vertical pocket plane $P_V$, respectively, the first abutment surface 64a may form an acute internal eighth angle $\alpha 8$, with the first lower jaw side surface 70a, and the second abutment surface 64b may form an acute internal ninth angle $\alpha 9$, with the first lower jaw side surface 70a.

In some embodiments of the present invention, the eighth angle $\alpha 8$ may be equal to the ninth angle $\alpha 9$.

As shown in FIGS. 6 and 7, the lower clamping jaw 60 may be divided into a front lower jaw 72 and a rear lower jaw 74 by a lower slot 76.

In some embodiments of the present invention, the front lower jaw 72 may be resiliently displaceable relative to the rear lower jaw 74.

Also in some embodiments of the present invention, the front support portion 66 may be disposed on the front lower jaw 72, and the second abutment surface 64b may be disposed on the rear lower jaw 74.

Further in some embodiments of the present invention, the first abutment surface 64a may be disposed on the front lower jaw 72.

It should be appreciated that provision of the lower slot 76 advantageously ensures simultaneous and reliable contact between the cutting insert's first and second flank surfaces 26a, 26b and the tool holder's first and second abutment surfaces 64a, 64b, as well as between the first or second lower surface 42a, 42b and the front support surface 68, thus avoiding an over-constrained configuration.

As shown in FIG. 9, the central disc axis A1 contains the center point $N_C$ of an imaginary circle C coplanar with one of the first and second circular sides $S_D1$, $S_D2$, and the imaginary circle C has a second diameter d2 greater than the maximum insert length $L_{MAX}$ and less than twice the maximum insert length $L_{MAX}$.

In some embodiments of the present invention, as shown in FIG. 9, a first arc portion $R_C$ of the imaginary circle C may intersect a lateral support portion 78 of the lower clamping jaw 60.

Also in some embodiments of the present invention, the first arc portion $R_C$ may be continuous and subtend an angle of greater than 25 degrees.

Further in some embodiments of the present invention, the first arc portion $R_C$ may be disposed on the rear lower jaw 74.

As shown in FIG. 10, one of first and second insert side surfaces 22a, 22b may be in contact with a lateral support surface 80 on the lateral support portion 78 of the lower clamping jaw 60. Each of the first and second side surfaces 22a, 22b comprises a side surface abutment region 39 spaced apart from the upper surface 28, and generally below a level 37 (indicated by broken line) of first and second cutting portions 34a, 34b. Contact between the first or second insert side surfaces 22a, 22b and the lateral support surface 80 occurs in the side surface abutment region 39.

It should be appreciated that the lateral support portion 78 contributes to the rigidity of the cutting tool 48.

It should also be appreciated that the lateral support surface 80, in addition to providing lateral support to the cutting insert 20, acts as a locating reference surface, aiding quick and efficient insertion of the cutting insert 20 into the insert receiving pocket 52 during assembly of the cutting tool 48.

In some embodiments of the present invention, the first and second abutment surfaces 64a, 64b may be located adjacent respective portions of the lateral support surface 80.

Also in some embodiments of the present invention, as shown in FIGS. 11a and 11b, the first abutment surface 64a may form an acute external tenth angle α10 with the lateral support surface 80, and the second abutment surface 64b may form an acute external eleventh angle α11 with the lateral support surface 80.

Further in some embodiments of the present invention, the tenth angle α10 may be equal to the eleventh angle α11.

It should be appreciated that for embodiments of the present invention in which the first and second abutment surfaces 64a, 64b form acute external angles with the lateral support surface 80, the insert receiving pocket 52 is advantageously provided with a dovetail-type configuration, and the cutting insert 20 is reliably secured therein.

In some embodiments of the present invention, the lateral support surface 80 may be parallel to the first lower jaw side surface 70a.

As shown in FIGS. 8 to 10, the upper clamping jaw 58 may have a clamping surface 82, and the clamping surface 82 may be in contact with the cutting insert's fastening portion 84 on the upper surface 28.

In some embodiments of the present invention, as shown in FIG. 2a, the cutting insert 20 may be divided into three equi-length segments $S_G1, S_G2, S_G3$ along the maximum insert length $L_{MAX}$, and the fastening portion 84 may be located on the middle segment $S_G2$ of the three equi-length segments $S_G1, S_G2, S_G3$.

Also in some embodiments of the present invention, a rear non-abutting portion 86 of the cutting insert's peripheral surface 24 which is not associated with the operative first primary cutting edge 36a may circumferentially extend from the fastening portion 84 to the second flank surface 26b. In such case, the entire rear non-abutting portion 86 may not be in contact with the tool holder 50.

Further in some embodiments of the present invention, the rear non-abutting portion 86 may include the second rake surface 38b, the second relief surface 40b, and the second lower surface 42b.

Yet further in some embodiments of the present invention, the fastening portion 84 may intersect the vertical insert plane P1.

It should be appreciated that for embodiments of the present invention, in which the cutting insert 20 has two cutting portions 34a, 34b, and the second primary cutting edge 36b is operative (not shown), the rear non-abutting portion 86 may circumferentially extend from the fastening portion 84 to the first flank surface 26a, and not include the second primary cutting edge 36b.

Although the present invention has been described to a certain degree of particularity, it should be understood that various alterations and modifications could be made without departing from the spirit or scope of the invention as hereinafter claimed.

What is claimed is:

1. A blade-shaped cutting insert (20), comprising:
   opposing first and second insert side surfaces (22a, 22b) with a peripheral surface (24) extending therebetween; and
   the peripheral surface (24) including first and second diverging flank surfaces (26a, 26b) and an upper surface (28), the first and second diverging flank surfaces (26a, 26b) located on opposite sides of a first plane (P1) transverse to the upper surface (28), and
   first and second cutting portions (34a, 34b) having respective first and second primary cutting edges (36a, 36b) which extend between the first and second insert side surfaces (22a, 22b),
      the first primary cutting edge (36a) being formed at the intersection of a first rake surface (38a) and a first relief surface (40a), with the first rake surface (38a) being disposed on the upper surface (28),
      the second primary cutting edge (36a) being formed at the intersection of a second rake surface (38b) and a second relief surface (40b), with the second rake surface (38b) also being disposed on the upper surface (28), and
   wherein:
   the first primary cutting edge (36a) defines a maximum insert width ($W_{MAX}$) between the first and second cutting portions (34a, 34b);
   the cutting insert (20) has a maximum insert length ($L_{MAX}$) measured perpendicular to the first plane (P1), and a maximum insert height ($H_{MAX}$) measured parallel to the first plane (P1),
   the maximum insert length ($L_{MAX}$) is more than twelve times greater than the maximum insert width ($W_{MAX}$),
   the maximum insert height ($H_{MAX}$) is more than eight times greater than the maximum insert width ($W_{MAX}$),
   the maximum insert width ($W_{MAX}$) is less than 1.5 mm,
   the first relief surface (40a) is spaced apart from the first flank surface (26a) by a first lower surface (42a),
   the second relief surface (40b) is spaced apart from the second flank surface (26b) by a second lower surface (42b), and
   the first lower surface (42a) forms an obtuse external angle (α4) with the first flank surface (26a).

2. The cutting insert (20) according to claim 1, wherein in a cross-section taken in a plane (P5) parallel to the first plane (P1), the first lower surface (42a) is V-shaped.

3. The cutting insert (20) according to claim 1, wherein the cutting insert (20) exhibits mirror symmetry about the first plane (P1).

4. The cutting insert (20) according to claim 1, wherein the maximum insert length ($L_{MAX}$) is measured between the first and second primary cutting edges (36a, 36b).

5. The cutting insert (20) according to claim 1, wherein in cross-sections taken in second and third planes (P2, P3) transverse to the first plane (P1), the first and second flank surfaces (26a, 26b) are respectively V-shaped.

6. The cutting insert (20) according to claim 1, wherein:
   an intermediate surface (30) spaces apart the first and second diverging flank surfaces (26a, 26b) and is bisected by the first plane (P1); and
   the first and second flank surfaces (26a, 26b) slope in an upward direction (DU) from the intermediate surface (30) to the first and second lower surfaces (42a, 42b), respectively.

7. The cutting insert (20) according to claim 1, wherein:
the first primary cutting edge (36a) is located a maximum first height (H1) above the first lower surface (42a) when measured parallel to the vertical insert plane (P1); and
the maximum first height (H1) is less than two-thirds the maximum insert height ($H_{MAX}$).

8. The cutting insert (20) according to claim 1, wherein:
each of the first and second side surfaces (22a, 22b) comprises a side surface abutment region (39) spaced apart from the upper surface 28; and
the side surface abutment region (39) is below a level (37) of the first and second cutting portions (34a, 34b).

9. A cutting tool (48) comprising:
a tool holder (50) having an insert receiving pocket (52) that opens out to a forward end (56) of the tool holder (50), the insert receiving pocket defined by an upper clamping jaw (58) and a lower clamping jaw (60); and
the cutting insert (20) in accordance with claim 1 removably secured in the insert receiving pocket (52) of the tool holder (50) with the first primary cutting edge (36a) being operative.

10. A cutting tool (48) comprising:
a tool holder (50) having an insert receiving pocket (52) that opens out to a forward end (56) of the tool holder (50), the insert receiving pocket defined by an upper clamping jaw (58) and a lower clamping jaw (60); and
a blade-shaped cutting insert (20) removably secured in the insert receiving pocket (52) of the tool holder (50) the cutting insert comprising:
 opposing first and second insert side surfaces (22a, 22b) with a peripheral surface (24) extending therebetween;
 the peripheral surface (24) including first and second diverging flank surfaces (26a, 26b) and an upper surface (28), the first and second diverging flank surfaces (26a, 26b) located on opposite sides of a first plane (P1) transverse to the upper surface (28); and
 first and second cutting portions (34a, 34b) having respective first and second primary cutting edges (36a, 36b) which extend between the first and second insert side surfaces (22a, 22b);
 the first primary cutting edge (36a) being formed at the intersection of a first rake surface (38a) and a first relief surface (40a), with the first rake surface (38a) being disposed on the upper surface (28);
 the second primary cutting edge (36a) being formed at the intersection of a second rake surface (38b) and a second relief surface (40b), with the second rake surface (38b) also being disposed on the upper surface (28);
 the first primary cutting edge (36a) defines a maximum insert width ($W_{MAX}$) between the first and second cutting portions (34a, 34b);
 the cutting insert (20) has a maximum insert length ($L_{MAX}$) measured perpendicular to the first plane (P1), and a maximum insert height ($H_{MAX}$) measured parallel to the first plane (P1);
 the maximum insert length ($L_{MAX}$) is more than twelve times greater than the maximum insert width ($W_{MAX}$);
 the maximum insert height ($H_{MAX}$) is more than eight times greater than the maximum insert width ($W_{MAX}$); and
 the maximum insert width ($W_{MAX}$) is less than 1.5 mm;
 wherein:
 the first primary cutting edge (36a) is operative;
 in a side view of the tool holder (50), the insert receiving pocket (52) includes first and second diverging abutment surfaces (64a, 64b) bisected by a vertical pocket plane (PV);
 a portion of the cutting insert's first flank surface (26a) is in contact with the first abutment surface (64a) and a portion of the second flank surface (26b) is in contact with the second abutment surface (64b); and
 the first and second abutment surfaces (64a, 64b) are disposed on the lower clamping jaw (60).

11. The cutting tool (48) according to claim 10, wherein the cutting tool (48) has a cutting depth (DC) greater than half the maximum insert length ($L_{MAX}$).

12. The cutting tool (48) according to claim 10, wherein the upper clamping jaw (58) is resiliently displaceable relative to the lower clamping jaw (60).

13. The cutting tool (48) according to claim 10, wherein:
the first primary cutting edge (36a) has first and second lateral end points (N1, N2) contained in opposing first and second circular sides ($S_D1$, $S_D2$), respectively, of an imaginary disc (DI),
the imaginary disc (DI) has a central disc axis (A1) containing at least one of the first and second lateral end points (N1, N2), a first diameter (d1) equal to the maximum insert length ($L_{MAX}$) and a thickness equal to the maximum insert width ($W_{MAX}$), and
first and second imaginary lines (L1, L2) parallel to the central disc axis (A1) and extending laterally outwardly from any respective points on the first and second circular sides ($S_D1$, $S_D2$), do not intersect any portion of the tool holder (50).

14. The cutting tool (48) according to claim 13, wherein a third imaginary line (L3) parallel to the central disc axis (A1) and extending laterally inwardly from a point on the first or second circular side (SD1, SD2) intersects a front support portion (66) of the lower clamping jaw (60).

15. The cutting tool (48) according to claim 13, wherein:
the lower clamping jaw (60) has a lateral support portion (78) in contact with one of the first and second side surfaces (22a, 22b) of the cutting insert (20);
the central disc axis (A1) contains the center point (NC) of an imaginary circle (C) coplanar with one of the first and second circular sides (SD1, SD2),
the imaginary circle (C) has a second diameter (d2) greater than the maximum insert length ($L_{MAX}$) and less than twice the maximum insert length ($L_{MAX}$), and
a first arc portion (RC) of the imaginary circle (C) intersects the lateral support portion (78) of the lower clamping jaw (60).

16. The cutting tool (48) according to claim 13, wherein:
the upper clamping jaw (58) has a clamping surface (82), and
the clamping surface (82) is in contact with a fastening portion (84) of the cutting insert's upper surface (28).

17. The cutting tool (48) according to claim 16, wherein:
a rear non-abutting portion (86) of the peripheral surface (24) which is not associated with the first primary cutting edge (36a) circumferentially extends from the fastening portion (84) to the second flank surface (26b), and
the entire rear non-abutting portion (86) makes no contact with the tool holder (50).

18. The cutting tool (48) according to claim 10, wherein:
the lower clamping jaw (60) has opposing first and second lower jaw side surfaces (70a, 70b) defining a lower jaw thickness (T), and the lower jaw thickness (T) is more than twice the maximum insert width ($W_{MAX}$) and less than five times the maximum insert width ($W_{MAX}$).

19. The cutting tool (48) according to claim 10, wherein: the first relief surface (40a) is spaced apart from the first flank surface (26a) by a first lower surface (42a).

20. The cutting tool (48) according to claim 19, wherein the first lower surface (42a) is in contact with a front support surface (68) on a front support portion (66) of the lower clamping jaw (60).

21. The cutting tool (48) according to claim 20, wherein: in a cross-section taken in a plane (P5) parallel to the first plane (P1), the first lower surface (42a) is V-shaped, and the front support surface (68) is correspondingly V-shaped.

22. The cutting tool (48) according to claim 20, wherein: the lower clamping jaw (60) is divided into a front lower jaw (72) and a rear lower jaw (74) by a lower slot (76), the front support portion (66) is disposed on the front lower jaw (72), and the second abutment surface (64b) is disposed on the rear lower jaw (74).

23. The cutting tool (48) according to claim 10, wherein: the lower clamping jaw (60) has a lateral support portion (78) in contact with one of the first and second side surfaces (22a, 22b) of the cutting insert (20).

24. A cutting tool (48) comprising:
a tool holder (50) having an insert receiving pocket (52) that opens out to a forward end (56) of the tool holder (50), the insert receiving pocket defined by an upper clamping jaw (58) and a lower clamping jaw (60); and
a blade-shaped cutting insert (2) removably secured in the insert receiving pocket (52) of the tool holder (50), the cutting insert comprising:
opposing first and second insert side surfaces (22a, 22b) with a peripheral surface (24) extending therebetween;
the peripheral surface (24) including first and second diverging flank surfaces (26a, 26b) and an upper surface (28), the first and second diverging flank surfaces (26a, 26b) located on opposite sides of a first plane (P1) transverse to the upper surface (28); and
first and second cutting portions (34a, 34b) having respective first and second primary cutting edges (36a, 36b) which extend between the first and second insert side surfaces (22a, 22b);
the first primary cutting edge (36a) being formed at the intersection of a first rake surface (38a) and a first relief surface (40a), with the first rake surface (38a) being disposed on the upper surface (28);
the second primary cutting edge (36a) being formed at the intersection of a second rake surface (38b) and a second relief surface (40b), with the second rake surface (38b) also being disposed on the upper surface (28);
the first primary cutting edge (36a) defines a maximum insert width ($W_{MAX}$) between the first and second cutting portions (34a, 34b);
the cutting insert (20) has a maximum insert length ($L_{MAX}$) measured perpendicular to the first plane (P1), and a maximum insert height ($H_{MAX}$) measured parallel to the first plane (P1);
the maximum insert length ($L_{MAX}$) is more than twelve times greater than the maximum insert width ($W_{MAX}$);
the maximum insert height ($H_{MAX}$) is more than eight times greater than the maximum insert width ($W_{MAX}$); and
the maximum insert width ($W_{MAX}$) is less than 1.5 mm;
wherein:
the first primary cutting edge (36a) is operative;
in a side view of the tool holder (50), the insert receiving pocket (52) includes first and second diverging abutment surfaces (64a, 64b) bisected by a vertical pocket plane (PV);
a portion of the cutting insert's first flank surface (26a) is in contact with the first abutment surface (64a) and a portion of the second flank surface (26b) is in contact with the second abutment surface (64b); and
the lower clamping jaw (60) has a lateral support portion (78) comprising a lateral support surface (80); and
one of first and second insert side surfaces (22a, 22b) is in contact with the lateral support surface (80).

25. The cutting tool (48) according to claim 24, wherein: the first abutment surface (64a) forms an acute external ($\alpha$10) with the lateral support surface (80), and the second abutment surface (64b) forms an acute external angle ($\alpha$11) with the lateral support surface (80).

* * * * *